(12) United States Patent
Augst

(10) Patent No.: US 12,545,273 B2
(45) Date of Patent: Feb. 10, 2026

(54) DEVICE AND METHOD FOR INTERACTING BETWEEN A VEHICLE CAPABLE OF BEING DRIVEN IN AN AT LEAST PARTIALLY AUTOMATED MANNER AND A VEHICLE USER

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 249 days.

(21) Appl. No.: 16/980,653

(22) PCT Filed: Mar. 8, 2019

(86) PCT No.: PCT/EP2019/055861
§ 371 (c)(1),
(2) Date: Sep. 14, 2020

(87) PCT Pub. No.: WO2019/175052
PCT Pub. Date: Sep. 19, 2019

(65) Prior Publication Data
US 2021/0016788 A1 Jan. 21, 2021

(30) Foreign Application Priority Data

Mar. 15, 2018 (DE) ...................... 10 2018 204 012.5
Aug. 10, 2018 (DE) ...................... 10 2018 213 550.9

(51) Int. Cl.
*B60W 50/10* (2012.01)
*B60W 40/08* (2012.01)
(Continued)

(52) U.S. Cl.
CPC ............ *B60W 50/10* (2013.01); *B60W 40/08* (2013.01); *B60W 50/087* (2013.01);
(Continued)

(58) Field of Classification Search
None
See application file for complete search history.

(56) References Cited

U.S. PATENT DOCUMENTS 10,745,049 B2   8/2020   Augst
2005/0155808 A1 7/2005   Braeuchle et al.
(Continued)

FOREIGN PATENT DOCUMENTS

CN   105584522 A   5/2016
CN   107458367 A   12/2017
(Continued)

OTHER PUBLICATIONS

International Search Report (PCT/ISA/210) issued in PCT Application No. PCT/EP2019/055861 dated May 31, 2019 with English translation (10 pages).
(Continued)

*Primary Examiner* — Christian Chace
*Assistant Examiner* — Katherine Marie Fitzharris
(74) *Attorney, Agent, or Firm* — Crowell & Moring LLP

(57) ABSTRACT

A device and operating method are provided for an interaction between a vehicle, which can travel in an at least partially automated manner, with an operator control element, which can be operated by the user of the vehicle for influencing at least the transverse guidance of the vehicle. A wheel positioning angle and/or a drive torque or braking torque at at least one wheel of the vehicle can be controlled in response to an operator control action at the operator control element or as a function of a control unit for controlling at least partially automated travel. Depending on the degree of haptic contact between the user of the vehicle and the operator control element, at least one movement of the vehicle can be executed on the basis of one or more operator control actions of the user and/or on the basis of (Continued)

data of the control unit for controlling the at least partially automated travel.

18 Claims, 1 Drawing Sheet

(51) Int. Cl.
  *B60W 50/00* (2006.01)
  *B60W 50/08* (2020.01)
  *B60W 60/00* (2020.01)
(52) U.S. Cl.
  CPC ... *B60W 60/001* (2020.02); *B60W 2050/0071* (2013.01); *B60W 2540/18* (2013.01); *B60W 2540/225* (2020.02); *B60W 2540/229* (2020.02); *B60W 2710/18* (2013.01); *B60W 2710/202* (2013.01)

(56) References Cited

U.S. PATENT DOCUMENTS

| | | | |
|---|---|---|---|
| 2012/0303217 | A1 | 11/2012 | Reichel et al. |
| 2015/0221222 | A1 | 8/2015 | Hamada et al. |
| 2016/0026181 | A1* | 1/2016 | Kopetz ............... G05D 1/0061 701/24 |
| 2016/0091083 | A1 | 3/2016 | Drees et al. |
| 2016/0132055 | A1 | 5/2016 | Matsuno et al. |
| 2016/0207537 | A1* | 7/2016 | Urano .................. B60W 50/16 |
| 2017/0137060 | A1* | 5/2017 | Wanner ............... B62D 15/025 |
| 2017/0200367 | A1 | 7/2017 | Mielenz |
| 2018/0052458 | A1* | 2/2018 | Tsuji .................... B60W 40/09 |
| 2019/0241195 | A1 | 8/2019 | Sakamoto et al. |

FOREIGN PATENT DOCUMENTS

| | | | |
|---|---|---|---|
| DE | 102 10 723 A1 | 9/2003 | |
| DE | 102010009133 A1 * | 8/2011 | ............ B60W 40/04 |
| DE | 10 2010 053 156 A1 | 6/2012 | |
| DE | 10 2012 002 318 A1 | 8/2013 | |
| DE | 10 2013 010 928 A1 | 12/2014 | |
| DE | 10 2013 010 630 A1 | 1/2015 | |
| DE | 10 2014 107 194 A1 | 11/2015 | |
| DE | 10 2014 210 966 A1 | 12/2015 | |
| DE | 10 2016 217 772 A1 | 3/2018 | |
| DE | 11 2016 007 059 T5 | 3/2019 | |
| WO | WO 2015/037084 A1 | 3/2015 | |
| WO | WO 2015/193059 A1 | 12/2015 | |

OTHER PUBLICATIONS

German-language Written Opinion (PCT/ISA/237) issued in PCT Application No. PCT/EP2019/055861 dated May 31, 2019 (12 pages).

German-language Search Report issued in German Application No. 10 2018 213 550.9 dated May 14, 2019 with partial English translation (12 pages).

Chinese-language Office Action issued in Chinese Application No. 201980019288.8 dated Feb. 20, 2023 with English translation (20 pages).

* cited by examiner

DEVICE AND METHOD FOR INTERACTING BETWEEN A VEHICLE CAPABLE OF BEING DRIVEN IN AN AT LEAST PARTIALLY AUTOMATED MANNER AND A VEHICLE USER

BACKGROUND AND SUMMARY OF THE INVENTION

The invention relates to a device, to an operating method and to a corresponding computer product for an interaction between a vehicle that is capable of being driven in an at least partially automated manner and a driver of the vehicle.

The present document is concerned with the technical object of presenting a device, an operating method and a corresponding computer program for an interaction of a vehicle that is capable of being driven in an at least partially automated manner with at least one user of the vehicle. In particular, the object of the invention is to enable a vehicle that is capable of being driven in highly automated manner to have an improved interaction with at least one user of the vehicle, and to create a novel user driving experience on the basis of the interaction.

The object is achieved by the independent claims. Advantageous embodiments are described in the dependent claims, though not exclusively. Attention is drawn to the fact that additional features of a claim that is dependent on an independent claim without the features of the independent claim, or only in combination with a subset of the features of the independent claim, may constitute a separate invention which is independent of the combination of all the features of the independent claim and which may be made the subject of an independent claim, of a divisional application or of a subsequent application. This applies equally to technical teachings described in the description, which may constitute an invention that is independent of the features of the independent claims.

In the present case, an intelligent interaction between a vehicle that is capable of being driven in an at least partially automated manner and a user of the vehicle—in particular, a driver of the vehicle, hereinafter also called "user"—will now be presented.

According to a first aspect, the invention is distinguished by a device for an interaction between a vehicle that is capable of being driven in an at least partially automated manner and a driver of the vehicle. The vehicle may include an operating element and a control unit for controlling at least partially automated driving, a wheel-setting angle (of a steerable wheel of the vehicle) and/or a driving torque or braking torque on at least one wheel of the vehicle being capable of being controlled in response to an operating action on the operating element or in a manner depending on a control unit for controlling at least partially automated driving. The device may furthermore have been configured to execute, depending on the degree of the haptic contact between the user of the vehicle and the operating element, which differs, in particular, from an operation of the operating element, a movement of the vehicle on the basis of the one or more operating actions of the user and/or on the basis of the data from a control unit for controlling at least partially automated driving.

The device may have been configured to execute-during the operation or, to be more exact, during the automotive operation of the vehicle-the movement, in particular the lateral guidance of the vehicle, alternatively or additionally on the basis of one or more operating actions of the user and/or on the basis of the data from a control unit for controlling at least partially automated driving. The device may also have been configured to determine in steps, or to change substantially in stepless manner, the data on the basis of the one or more operating actions of the user and/or data on the basis of a control unit for controlling at least partially automated driving in the course of determining at least one movement of the vehicle, or a respective number of features for presetting the movement of the vehicle, depending on the degree of the haptic contact.

In particular, the at least one movement of the vehicle may be one or more individual actions, for example turning off, exiting a highway, entering a highway, cutting in, overtaking, as well as continuing, forcing, terminating an overtaking process, and the like. Furthermore, the movement of the vehicle may be a significant part of a process for entering a parking space, of a process for leaving a parking space, or of a marshaling process, or of a transition from driving to parking or vice versa, or may correspond to these processes.

The movement of the vehicle preferably comprises two or more individual actions, in particular two different lateral-guidance actions. For instance, the movement of the vehicle may comprise two or more actions that, only together, in a definite combination or altogether, result in an expedient movement of the vehicle, for example a definite maneuver. The at least one movement of the vehicle may, in particular, constitute a significant part of, for example, a maneuver of the vehicle in several parts, or may comprise one or more complete maneuvers.

For instance, the maneuver of the vehicle may be a driving maneuver—for example, an evasive maneuver, an overtaking maneuver, a turning maneuver, etc. —or may be a maneuver for entering a parking space, a maneuver for leaving a parking space, and/or a marshaling maneuver.

The movement of the vehicle may also be understood as a (definite) change in the movement of the vehicle, in particular in the lateral guidance of the vehicle. For instance, the change in the movement may be based on a change or deviation from a rectilinear movement or from a (regulated) movement (guidance) of the vehicle implemented from a lane marking.

The at least one operating action preferably characterizes two or more individual decisions and/or a process extended in time and/or space, in particular a definite movement process, in particular a maneuver. The operating action may characterize one or more features of a movement of the vehicle desired by the user. In this connection, let it be emphasized expressly that the operating action does not, in particular, characterize or have to characterize all the features and/or quantitative variables of the desired movement of the vehicle.

In particular, the operating action represents a spatially extended process which is related to the environment of the vehicle and, in particular, has a definite relatedness to the environment of the vehicle. In particular, the operating action characterizes a spatially extended process, in particular a movement process with a definite spatial extent. In particular, the operating action does not, or does not necessarily, characterize a control of the movement of the vehicle to be implemented at once or exactly. For instance, there is no one-to-one relationship or equal relationship for all the operating states of the device between the at least one operating action and the movement of the vehicle following upon the detection of the operating action.

The operating action preferably characterizes a planned, preferred movement of the vehicle proposed by the user of the vehicle, in particular the driver. In particular, the data on the basis of the operating action characterize the features of a spatial and/or temporal extent of the movement and/or a relatedness to definite events and/or circumstances-for example, other road-users, objects, traffic signs, etc. in the environment of the vehicle. The operating action may relate to events and/or circumstances in the environment of the vehicle that have already been obtained, in particular that have already manifested themselves, or to circumstances in the environment of the vehicle that are only expected (in particular, with a certain probability). For instance, the data on the basis of the operating action may characterize one or more features of a maneuver, for example in relation to one or more road- users or objects in the environment of the vehicle.

For instance, the operating action may possibly be characteristic of: "driving through or parking between two (definite) objects", "overtaking a definite road-user", etc.

The operating action itself preferably differs from the haptic contact. For instance, the operating action comprises a rotation, displacement or change of the angle of at least one part of the operating element in a definite direction. For instance, the haptic contact relates to an influence, on a part of the operating element, that has a different orientation than the operating action. This influence may relate, for example, to a torsional force, a torsional moment and/or a torsional movement of at least one hand of the user on a part—for example, a gripping area or a rim—of the operating element.

The data from a control unit for controlling at least partially automated driving may, in particular, be characteristic of:
- a definite movement preset,
- one or more features of a movement of the vehicle,
- control signals for a direct or indirect triggering of the actuators of the vehicle, for example of at least one wheel-angle regulator, of the driving torque, of the braking torque, of a so-called wheel-slip control and/or of one or more actuators of the chassis.

The data from a control unit for controlling at least partially automated driving may correspond, at least partially, to a product of artificial intelligence.

The data from the control unit for controlling at least partially automated driving may preferably encompass a spatially extended movement or a movement sequence. This movement—in particular, this movement sequence—may relate to the environment of the vehicle, in particular may have a definite relatedness to the current environment.

Particularly preferably, the data from the control unit for controlling at least partially automated driving characterize a definite movement of the vehicle that is to be executed in a subsequent time-interval, in particular in a definite time-interval and/or in a connection with a definite event, with a definite process, with an expected traffic situation (coming soon), roadway location, etc.

For instance, the data from the control unit for controlling at least partially automated driving may encompass a planned, preferred movement of the vehicle proposed by the control unit. In particular, the data characterize the features of a spatial and/or temporal extent of the movement and/or a relatedness to events and/or circumstances, for example road-users, objects, traffic signs, etc. in the environment of the vehicle that are already present, in particular have manifested themselves, or are expected (only or at least with a certain probability). For instance, the data from the control unit for controlling at least partially automated driving may characterize one or more features of a maneuver, for example in relation to one or more road-users or objects in the environment of the vehicle.

In particular, depending on the degree of the haptic contact, a determination of the parameters of the movement on the basis of the one or more operating actions may be capable of being implemented as an alternative to, or in addition to, the determination of the movement of the vehicle on the basis of a movement preset from the control unit for controlling at least partially automated driving.

In the previously unpublished (at the date of priority) German patent application with file reference 102016217772.9, a device, an operating method and an electronic control unit for controlling a vehicle that is capable of being driven in an at least partially automated manner are described, with which not only the operating method described in the present documents can be implemented advantageously, but which device is advantageously developed further with the present invention. In the present case, therefore, reference is made in full to the aforementioned previously unpublished German patent application; in particular, the content thereof shall be partially or completely incorporated into the disclosure of the present invention by reference.

According to another advantageous configuration, depending on the degree of the haptic contact it is decided whether and, where appropriate, to what extent a movement of the vehicle is to be executed on the basis of the one or more operating actions of the user and/or whether and, where appropriate, to what extent a movement of the vehicle is to be executed on the basis of the data from the control unit for controlling at least partially automated driving.

The device has preferably been configured to ascertain a degree of the haptic contact between the user of the vehicle and the operating element and, depending on the degree of the haptic contact between the user of the vehicle and the operating element, to decide whether and, where appropriate, to what extent a movement of the vehicle on the basis of the one or more operating actions of the user and/or whether and, where appropriate, to what extent a movement of the vehicle on the basis of a movement preset from the control unit for controlling at least partially automated driving is/are to be executed.

For instance, the device has been configured to decide, depending on the degree of the haptic contact, whether to execute a movement of the vehicle at least for the most part and/or at least with regard to definite features, in particular only with regard to definite (for example, crucial) features of the movement of the vehicle, depending on one or more operating actions of the user. For instance, the device has been configured to ignore and/or to interpret one or more features of the operating action.

For instance, the device has been configured to decide, depending on the degree of the haptic contact, whether to execute a movement of the vehicle at least for the most part and/or at least with regard to definite features, in particular only with regard to definite (for example, crucial) features of the movement of the vehicle, depending on the data of the control unit for at least partially automated driving. For instance, the device has been configured to ignore one or more features of the data of the control unit and/or, depending on the degree of the haptic contact, to adapt them to the operating action and/or in a manner depending on the features of the operating action.

Alternatively or additionally, the features of the movement of the vehicle that have been preset by the operating action and those features of the movement of the vehicle that have been preset by the control unit for at least partially automated driving can be changed, depending on the degree of the haptic contact between the user and the operating element.

For instance, the device may have been configured to implement, depending on the degree of the haptic contact, in particular on a definite change in the degree of the haptic contact, an, in particular, brief shift of the weighting of the data for operating the vehicle that is capable of being driven in an at least partially automated manner from the data on the basis of one or more sensors of the vehicle and/or data on the basis of a digital map to the data on the basis of the operating action of the user. It may be a question of a shift in several (defined) stages, or of a substantially stepless shift. In other words, a transition between a control of the movement of the vehicle that is largely dependent on the data on the basis of the operating action to the control of the movement of the vehicle depending on the data on the basis of the control unit for implementing at least partially automated driving during automotive operation of the vehicle may be capable of being implemented in stages or in substantially stepless manner.

According to another advantageous configuration, one or more movement parameters of the at least one movement of the vehicle are capable of being ascertained on the basis of the data from one or more operating actions of the user and/or on the basis of the data from the control unit for controlling at least partially automated driving by means of a predetermined first mathematical function.

In particular, the one or more movement parameters of the at least one movement of the vehicle may include a parameter that characterizes the lateral guidance of the vehicle, and/or may include a parameter that characterizes the longitudinal guidance of the vehicle.

The predetermined first mathematical function may characterize a predefined mathematical regularity, rule, instruction and/or relation between one or more degrees of the haptic contact and a decision to be set or at least to be striven for thereupon.

The first mathematical function may represent, for instance, coefficients relating to one or more, in particular predetermined, equations, polynomials or of a predetermined mathematical model, in particular a simulation. It is preferably a question of one or more expediently defined mathematical interrelationships at least between one or more (where appropriate, different, capable of being distinguished with the device) degrees of the haptic contact and one or more variables (where appropriate, different, capable of being distinguished with the device) representing the degree of automation.

The first mathematical function particularly preferably includes at least one dependency on a time-dependent parameter ("time parameter") and/or at least one dependency on a space-dependent parameter ("space parameter"). For instance, the time-dependent parameter may be a temporal change, to be taken into account, in the degree of the haptic contact and/or a temporal change in a decision to be implemented thereupon. For instance, the space-dependent parameter may be a spatial extent, to be taken into account, of the change in the degree of the haptic contact and/or a spatial extent of a change to be implemented thereupon relating to the consideration of the one or more operating actions and/or of one or more movement presets from the control unit for controlling at least partially automated driving. In particular, the first mathematical function may represent at least one function characterizing a gradient, for instance in relation to a time-dependent variable and/or to a space-dependent variable. For instance, the first mathematical function may be defined in such a manner that a brief change (valid in a brief, in particular defined, temporal or spatial extent) of the decision criteria is capable of being implemented. In this case, a substantially only, or predominantly only, one or more definite aspects of the decision may be capable of being changed.

In other words, the first mathematical function may lead to a particularly dynamic change, capable of being implemented during automotive operation, of different aspects of a decision between a movement at least partially, in particular at least predominantly, on the basis of the movement preset by the user and a movement at least partially, in particular at least predominantly on the basis of the movement preset by the control unit for controlling the at least partially highly automated driving. In this case, by means of a definition or a dynamic ascertainment of the parameters of the first mathematical function the features of a dynamic interaction between the vehicle and the driver of the vehicle may be capable of being changed (in each instance expediently).

The device may have been configured (in particular, by the mannering or changing of the first mathematical function) in such a manner that different aspects of the decision are capable of being changed by different features of the haptic contact (at least briefly, in particular for the most part detached from one or more further aspects of the decision, in particular adaptively).

For instance, the first mathematical function may characterize an assignment or an assignment instruction between one or more degrees of the haptic contact or a definite change in the degree of the haptic contact and one or more definite decision criteria.

For instance, the device may have been configured to change the at least one decision, depending on a degree of the haptic contact, in particular on a change in the haptic contact corresponding to a torsional force, torsional moment and/or a torsional movement of at least one hand of the user on a part of the operating element, for example on a gripping area or on a rim of the operating element.

In a simplified example, depending on a detected change in the degree of the haptic contact a brief movement of the vehicle, to be executed at once or in a subsequent time-interval, can be brought about by means of an operating action implemented in the same time-interval, shortly before or shortly after. In this process, no takeover, or no general or complete takeover, of the driving tasks by the driver has to take place.

According to an advantageous configuration, one or more decision criteria relating to a decision between a movement that takes place at least predominantly on the basis of the data of one or more operating actions of the user, or a movement that takes place at least predominantly on the basis of a movement preset of the control unit for controlling the at least partially highly automated driving, are determined in a manner depending on the degree of the haptic contact or are changed during automotive operation, in particular dynamically.

For instance, depending on the degree of the haptic contact,
- a first decision criterion relating to a risk of collision with at least one road-user or an object in the environment of the vehicle,
- a second decision criterion relating to adherence to the traffic rules,
- a third decision criterion relating to consideration of the interests of at least one road-user in the environment of the vehicle, a fourth decision criterion relating to energy efficiency, in particular in connection with the movement of the vehicle, a fifth decision criterion relating to time efficiency, for example in relation to the reaching of a destination, are varied.

The decision criterion or criteria may relate to definite portions of the data on the basis of the control unit or of the data on the basis of the one or more operating actions or may relate to the parameters, characterized with the respective data, of the at least one movement of the vehicle. For instance, depending on a definite first degree of the haptic contact, in particular on a definite first change in the degree of the haptic contact, a first selection of decision criteria can be changed and/or, depending on a definite second degree of the haptic contact, in particular on a definite first change in the degree of the haptic contact, a second selection of decision criteria can be changed.

In particular, the influence of at least one decision criterion and/or a change in a weighting of the influences of at least two decision criteria can be changed, depending on the degree of the haptic contact.

The consideration of the interests of at least one other road-user may be, for example, aspects of a disability, non-disability, an anticipation, for example consideration of an advantage and/or disadvantage that (would) arise, depending on the decision for at least one road-user in the environment of the vehicle.

For instance, the first mathematical function may have been configured in such a manner that in the case of a low available degree of automation and in the case of a low degree of the haptic contact and/or at least a tendency toward a diminution of the degree of the haptic contact and/or in the case of at least a tendency toward a diminution of the degree of the haptic contact one or more definite decision criteria of the decision between a movement of the vehicle on the basis of the at least one operating preset of the user and a movement on the basis of the at least one movement preset of the control unit for controlling at least partially automated driving are capable of being changed.

For instance, the interrelationship that is capable of being mapped in the at least one first mathematical function may lead to a decision for a movement of the vehicle at least predominantly on the basis of the data on the basis of the one or more operating actions of the user, or may be feasible for a movement of the vehicle at least predominantly on the basis of the preset of the control unit for at least partially automated driving in accordance with definite decision criteria. The one or more decision criteria may be capable of being changed, depending on the degree of the haptic contact.

Alternatively or additionally, depending on the degree of the haptic contact, in particular on a change in the degree of the haptic contact, in particular dynamically, for example relative to a definite stretch of roadway, driving situations and/or driving maneuvers between the data on the basis of the operating actions of the user, a "main driver" or "master", who/which may be the user or the control unit ("vehicle"), can be determined, and/or a "co-pilot" or "observer", who/which may be the user or the control unit ("vehicle"), can be determined.

For instance, user information can also be output that is characteristic of whether and, where appropriate, to what extent the at least one—in particular, at least partially impending—movement of the vehicle—in particular, a definite movement of the vehicle—is being executed, was executed or will be executed on the basis of the operating action of the user and/or on the basis of the data of the control unit for at least partially automated driving.

According to an advantageous configuration, a decision about a movement of the vehicle on the basis of the one or more operating actions and/or depending on a movement preset from the control unit for controlling at least partially automated driving is dependent on a global or local minimum of a function that represents a measure of a disadvantage depending on the movement of the vehicle and/or depending on a global or local maximum of a function that represents a measure of an advantage depending on the movement of the vehicle.

A global or local minimum or maximum does not necessarily have to be attained. A certain direction toward or approximation to the respective maximum or minimum is also to be understood as the global or local minimum or maximum.

According to an advantageous configuration, a decision about a movement of the vehicle on the basis of the one or more operating actions and/or depending on a movement preset from the control unit for controlling at least partially automated driving is made in a manner depending on a variable representing an available degree of automation.

In this context, the term "available degree of automation" will firstly be defined here. This term may, for example, characterize aspects or features of driving automation that are available at a point in time, at a position, in a driving situation. In other words, the "available degree of automation" may mean a current available reserve of the degree of automation (current and for the forthcoming period) that is capable of being implemented. The available degree of automation is, in particular, one or more usable aspects, features, parameters of the degree of automation that are available if required and that thereupon (depending on diverse criteria) are actually at least partially utilized and/or at least partially unutilized. This available degree of automation is distinguished in the present invention, in particular, from a degree of automation actually to be implemented. The variable representing the available degree of automation may relate to a current and/or subsequent time-interval or route-interval.

According to an advantageous configuration, one or more operating actions of the user in a first time-interval are evaluated, and thereupon a comparison is carried out of a (in particular, not yet executed or not fully executed, first) movement of the vehicle that would result on the basis of the data from one or more operating actions of the user with a (in particular, not yet executed or not fully executed, second) movement of the vehicle that would result on the basis of the movement preset from the control unit for controlling at least partially automated driving. Thereupon, depending on or on the basis of the comparison carried out, a (real) movement of the vehicle may be capable of being executed, in particular by the control of a wheel-angle regulator on the basis of the (first) data on the basis of the one or more operating actions and/or on the basis of the data of the control unit for at least partially automated driving. The (real) movement may be capable of being executed or may be executed in a second time-interval which differs from the first time-interval.

A movement of the vehicle on the basis of the at least one or more operating actions and/or on the basis of the data of the control unit for at least partially automated driving can thereupon preferably be executed in a second time-interval which differs from the first time-interval.

For instance, the device has been configured to evaluate one or more operating actions, data being ascertained on the basis of one or more operating actions, in particular characterizing a movement of the vehicle that is preset with the operating action, for example the features or movement parameters of the movement. Furthermore, the device may have been configured to compare these data with the data on the basis of the control unit for at least partially automated driving. Furthermore, the device can be configured to execute thereupon, in particular depending on the outcome of the comparison of the data, a movement of the vehicle in a second time-interval.

This results in the advantage that one or more operating actions, in particular a definite sequence of operating actions (also in their totality), are capable of being evaluated unambiguously, in particular before they are implemented. The data relating to a movement preset from the control unit for controlling at least partially automated driving may be from a time-interval prior to and/or during the second time-interval.

For instance, a movement of the vehicle on the basis of the one or more operating actions on the operating element brought about by the user in a first time-interval may be executed not in the first time-interval but in a second time-interval. For instance, a second time-interval may be approximately at least 1, 2, 3, 5, 10, 20 seconds after the first time-interval.

According to an advantageous configuration, the data relating to a movement preset from the control unit for controlling at least partially automated driving are data on the basis of the environment data from one or more time-intervals (relating to one or more time-intervals) which were prior to the second time-interval and/or prior to the first time-interval.

For instance, the data from the control unit may have been ascertained on the basis of the environment data (input data, for example in the form of environment-capture data, map data, etc.) which, in turn, relate to a time-interval, in particular a period of time of more than 1, 2, 5, 15, 20, 30 seconds. For instance, the device has been configured to capture the environment data and/or to process them at least partially also in the time-intervals in which no significant control of the movement of the vehicle by the control unit for at least partially automated driving is implemented. For instance, the control unit for at least partially automated driving may have been configured in the invention to implement a read-in of the data and/or data processing in the course of the operation of the vehicle, in a manner somewhat comparable to that in the case of (active) highly automated driving or in an operating mode for at least highly automated driving. The device may have been configured to store the data—in particular, preprocessed data on the basis of the environment data—in particular in a memory structure, for example to store (or buffer) them in a so-called ring memory. For instance, a read-out, further processing and/or consideration of the data take(s) place in the course of the determination of the movement of the vehicle in a manner depending on the degree of the haptic contact.

According to an advantageous configuration, the device has been configured to decide, depending on a currently relevant driving situation or on a roadway section currently to be driven along, on a movement (to be executed thereupon) of the vehicle on the basis of the one or more operating actions and/or depending on a movement preset from the control unit for controlling at least partially automated driving. In other words, the device may have been configured to decide, depending on the current driving situation and/or traffic rules applying currently or locally, which are ascertained or read in by the device, whether and to what extent a movement of the vehicle on the basis of the one or more operating actions is to be executed as an alternative to a movement that is dependent or based on a movement preset from the control unit for controlling at least partially automated driving.

In particular, the decision as to whether and, where appropriate, to what extent a movement of the vehicle on the basis of the one or more operating actions of the user and/or whether and, where appropriate, to what extent a movement of the vehicle on the basis of a movement preset from the control unit for controlling at least partially automated driving is/are to be executed relates to a definite current driving situation or a driving situation impending in the near future, to a current or impending time-interval and/or to a route-interval.

For instance, the route-interval, which may also be designated as a roadway location, may have been characterized by a definite road arrangement and/or lane arrangement. For instance, a roadway location may have been characterized by a combination of the features of the road arrangement and/or lane arrangement. For instance, a definite roadway location may have been characterized by an identifier. Such an identifier may characterize a definite combination (expedient for the implementation of the invention) of the features of the roadway location. Merely as an example, a combination of the following features of a roadway location may be considered:

a (typically shaped or standardly shaped) intersection,
a transition from, for example, a 2-lane road to a 3-lane road,
a junction consisting of 3 roads (for example, a so-called "T-junction", in which the roads have been connected in the form of the letter "T"), 4, 5 or more than 5 roads, in particular at one or more angles that differ significantly from a right angle,
traffic circle, in particular with 3, 4, 5 or more than 5 roads that are not each oriented at 90° with respect to one another,
roadway location in connection with a definite lane, for example identification number of a lane, for example of one of more lanes of a road or of a direction of movement of a road, or of a type of lane, for example a turning lane, a fast or slow lane, etc.

The driving situation may, for example, be understood as a definite arrangement of driving parameters of road-users. In particular, a driving situation is characterized by a definite pattern. The driving situation may also be characterized by a spatial pattern of the so-called unused spaces in the environment of the vehicle. Furthermore, the driving situation may take account of one or more parameters of the traffic rules (relevant in connection with this situation), for example traffic signs, rights of way, traffic-signal phases. For instance, the driving-situation parameter(s) may relate to or be based on environment-sensor data and/or may take information transmitted to the vehicle (for example, from another road-user, by means of Car-2-Car or Car-to-X) into account. The environment-sensor data may be data, processed in a definite way, of an environment-capturing sensor, in particular of a sensor system of at least one vehicle.

The driving situation may preferably be characterized by:
a (definite) spatial distribution of the road-users and/or of the movement parameters of the road-users, in particular a distribution pattern of the road-users in the environment of the vehicle,
a (definite) spatial distribution of immovable objects in the environment of the vehicle, a relative position and/or movement parameters relating to definite types of lane markings, traffic signs, traffic signals (not necessarily relating to definite traffic signals, etc.), information about the right of way of the ego vehicle, in particular as regards definite road-users and/or road-users that actually or at least potentially are coming or may come from definite directions, for example from a crossing road on the right or from the left, information relating to an action—for example, an action exceeding a limiting value—of a road-user in the environment of the vehicle—for example, sounding the horn, flashing the headlights, jostling, overtaking the vehicle, an overtaking attempt and such like.

The at least one driving situation may preferably be a driving situation exceeding definite limiting values or a driving situation that is characterized by parameters exceeding definite limiting values. For instance, the at least one driving situation may be a driving situation with an undesirable or dangerous approach to an object or a road-user, an acceleration value exceeding a limiting value, an undesirable arrangement relative to other road-users, etc. The driving situation may be a special situation (for example, occurring comparatively seldom) or a dangerous driving situation—for example, a driving situation for which an increased risk is ascertained or assumed.

In particular, the meaning of the term "driving situation" differs from a colloquial meaning of the term "traffic situation". Alternatively or additionally, however, the present traffic situation can also be ascertained and expediently taken into account. In this case, an identifier of the traffic situation can be read out, for example from data of a navigation system, and taken into account in the course of driving along a corresponding roadway location. In a simplified case, such an identifier may correspond, for example, to definite categories: "free traffic", "dense traffic", "slow-moving traffic", "jam", etc.

The device may also have been configured to apply one or more definite interrelationships described in this document, depending on a type of roadway location and/or type of driving situation detected, for example during the operation of the device. The device may also have been configured to assume a definite type of roadway location and/or type of driving situation if a degree of similarity with a, for example, saved, in particular statistically relevant, type of roadway location and/or type of driving situation is ascertained.

According to an advantageous configuration, a degree of the coupling between at least a first part of the operating element and the at least one wheel-angle regulator of the vehicle is capable of being set or changed, depending on the decision as to whether and, where appropriate, to what extent a movement of the vehicle on the basis of the one or more operating actions of the user and/or whether and, where appropriate, to what extent a movement of the vehicle on the basis of a movement preset from a control unit for controlling at least partially automated driving is/are to be executed.

The degree of coupling is preferably capable of being changed dynamically and/or predictively, depending on the decision as to whether and, where appropriate, to what extent a movement of the vehicle on the basis of the one or more operating actions of the user and/or whether and, where appropriate, to what extent a movement of the vehicle on the basis of a movement preset from the control unit for controlling at least partially automated driving are to be executed. The degree of coupling may be capable of being set in relation to a current driving situation or a driving situation impending in the near future, a current or impending time-interval and/or route-interval.

Alternatively or additionally, the device may have been configured to change (in particular, actively, dynamically in automotive operation) at least one degree of the coupling between at least a first part of the operating element and an actuator for controlling at least the lateral guidance of the vehicle, for example a wheel-angle regulator, depending on a variable representing an available degree of automation.

In a first example, the degree of coupling can be lowered, for example below a definite threshold value, prior to or during the input of the operating input. For instance, the operating action itself or an intention of the driver to input a definite operating action can be ascertained, and thereupon an at least partial, at least initial, change in the degree of coupling, in particular a decoupling except for definite angular limits and/or positional limits, can be implemented.

It should be emphasized that the degree of coupling is capable of being changed, in particular from a degree of automation available in a current time-interval and/or in a time-interval in the near future. An available degree of automation may be, so to speak, the (current and for the forthcoming period) available reserve of the degree of automation that is capable of being implemented. The available degree of automation is, in particular, one or more usable aspects, features, parameters of the degree of automation that are available if required and that thereupon are actually at least partially utilized and/or at least partially unutilized (depending on diverse criteria, in particular on predetermined criteria). In this sense, an at least partial (mechanical, mechatronic, logical) decoupling of the operating element, for example of a wheel-angle regulator, can, for example, be implemented if it has been ascertained that a sufficiently high (at least potentially feasible) degree of automation is available or can be implemented when required, for example in case of a change in the driving situation. The available degree of automation may therefore be regarded as an "available safety net". The degree of automation that is capable of being implemented can be ascertained; in particular, a predetermined reserve of the available degree of automation can, as a condition, lead to a diminution of the degree of coupling, in particular as far as a predetermined threshold value.

The degree of coupling may be capable of being changed, in particular in steps or in stepless manner.

According to an advantageous configuration, one or more operating actions of the user is/are representative of a desired movement of the vehicle, in particular a definite lateral guidance of the vehicle, which is capable of being captured with the at least partially decoupled operating element. In particular, the device has been configured to capture, with the at least partially decoupled operating element, the one or more operating actions that have been implemented in a manner such that in a (feasible or conceivable) manual operating mode of the vehicle they serve for controlling the lateral guidance of the vehicle. In the decoupled state, the operating element may be capable of being actuated, at least in principle, or in the same manner. In particular, the actuation in the invention does not lead, or does not necessarily lead, to a corresponding alteration of the movement, in particular the lateral guidance, of the vehicle.

The device preferably includes the operating element which is at least partially decoupled or capable of being decoupled (mechanically, mechatronically or logically) from the control of the chassis of the vehicle. The device may also have been configured to bring about and/or to implement a change in the degree of coupling in connection with a capture of one or more operating actions of the user.

The device has particularly preferably been configured to diminish the degree of coupling of the operating element in connection with an implementation of an operating action and/or with the capture of the one or more operating actions. The diminution of the degree of coupling can be implemented if a desire of the user to implement a definite operating action is detected. For instance, the degree of coupling can be changed in a temporal dependency with the input of the operating action, for example substantially for the duration of the operating action.

For instance, the device has been configured to capture one or more operating actions of the user representing a desired movement of the vehicle with the at least partially decoupled operating element. One or more operating actions of the driver, which take place in an at least partially decoupled state of the operating element, can, depending on the degree of the haptic contact, preferably be captured, interpreted and/or taken into account in the course of the determination of the movement of the vehicle.

An at least partially decoupled operating element may be equated with a low or non-existent degree of coupling. The degree of coupling can be set within one or more certain limits (positional limits, angular limits), in particular only, or predominantly only, within one or more certain limits. For instance, outside of one or more certain limits (for example, when leaving certain positional limits, angular limits) a differing degree of coupling, in particular a higher degree of coupling, may apply, for example right up to a complete coupling.

According to another advantageous configuration, the at least one operating element is a steering handle, the steering handle having been configured to be capable of being operated with one or two hands of one or more users, and hence to control at least the lateral guidance of the vehicle in an at least partially manual driving mode. Furthermore, the same operating element may also have been configured for influencing, in particular controlling, the longitudinal guidance of the vehicle in an at least partially automated driving mode.

The device may, in particular, also have been configured to influence in particular to control, at least for a time, a movement of the vehicle with regard to the longitudinal guidance, depending on a steering handle. In particular, the changing of the longitudinal guidance of the vehicle may be capable of being influenced by means of a more or less explicit preset by the at least one (definite) operating action on the steering handle and/or depending on a degree of the haptic contact. The device may also have been configured to change a movement of the vehicle with regard to the longitudinal guidance, depending on a change in the lateral guidance of the vehicle, requested by the operating action, for example in accordance with a preset instruction.

In a simplified case, a definite degree—in particular, a pattern—of the haptic contact on the steering handle may be predefined or capable of being preset. An acceleration and/or deceleration of the vehicle that is capable of being changed (metered) in accordance with a preset instruction, in particular in stepwise manner, may be capable of being preset.

According to another advantageous configuration, the device has been configured to execute a movement of the vehicle on the basis of the one or more operating actions and/or depending on a movement preset from the control unit for controlling at least partially automated driving, depending on one or more of the following parameters which are capable of being ascertained with means pertaining to the vehicle. The parameters may preferably characterize a state of attentiveness of the user, a direction of vision or accommodation of vision of the user, a state of the user, in particular his/her state of alertness.

The parameters may apply to a current time-interval, to a time-interval lying ahead, in particular to a prediction of the expected parameters for the time-interval in which the movement of the vehicle is being executed, and/or to a prior time-interval, in particular as previous parameter values or historical values. In this case, a distinction may preferably be made between an influencing of the movement of the vehicle, desired or brought about with the at least one operating action of the user, and an, in particular, fundamental or permanent takeover intention by a user and/or a takeover request to a user of the vehicle. In particular, a decision and/or at least one decision criterion for executing a movement of the vehicle on the basis of the one or more operating actions can be made as an alternative to, or in addition to, the one movement of the vehicle on the basis of a movement preset from the control unit for controlling at least partially automated driving, depending on the parameters characterizing a state of attentiveness of the user, a direction of vision or accommodation of vision, and/or a state of the user. One or more of the parameters may relate to a current and/or a prior time-interval of approx. 1, 3, 7, 10, 30 seconds.

According to another advantageous configuration, the device has been configured for outputting driver information that characterizes at least one decision reason for the at least one movement of the vehicle on the basis of the operating action of the user and/or on the basis of the data of the control unit for at least partially automated driving.

The control unit for controlling at least partially automated driving may be a separate control unit, in particular a control device, a so-called pad, a definite resource, more or less delimited within a computational system—for example, definite processor cores, memories, etc. This resource may have been configured for implementing the at least highly automated driving. The control unit in this document represents, in particular, the technical determination—ascertained, for example, by means of artificial intelligence—of the movement of the vehicle. For instance, the control unit or the data from the control unit may correspond at least substantially to a control unit or to the data that are or would be suitable also for operating the vehicle in an at least partially or temporarily highly automated operating mode—that is to say, also, at least for a time, without any participation of the user. In particular, the device includes the control unit. The device and/or the control unit for controlling at least partially automated driving may include at least one computational unit built into or carried in the vehicle, but is/are not restricted thereto.

In particular, at least a part of the device may include a separate computational unit, for example another control device, a so-called pad, one or more definite resource(s) more or less delimited within a computational system—for example, definite processor cores, memories, etc. This computational unit or these resources may have been configured at least for deciding on the movement of the vehicle on the basis of the data relating to one or more definite operating actions or on the basis of the control unit for at least partially automated driving. One or more parts of the device or of the operating method may be implemented in a computational unit arranged at a distance, for example in a back end.

According to a further aspect of the invention, an operating method (method) is claimed for an interaction between a vehicle that is capable of being driven in an at least partially automated manner in response to one or more operating actions of the user on the operating element or in a manner depending on a control unit for controlling at least partially automated driving, according to which a wheel-setting angle and/or a driving torque or braking torque on at least one wheel of the vehicle is/are capable of being controlled, and wherein at least one movement of the vehicle is executed, depending on the degree of the haptic contact between the user of the vehicle and the operating element, on the basis of the one or more operating actions of the user and/or on the basis of the data from a control unit for controlling at least partially automated driving.

At least one movement of the vehicle can be executed, depending on the degree of the haptic contact between the user of the vehicle and the operating element, on the basis of the one or more operating actions of the user as an alternative to, or in addition to, a movement on the basis of the data from a control unit for controlling at least partially automated driving.

Furthermore, the operating method may involve an arbitrary selection of process-engineering features or combinations of features and/or features corresponding to the claims or to features of the device that are disclosed in this document. Furthermore, the operating method may be an operating method for operating the device.

The interaction may be, in particular, a presetting or co-determination of a movement, in particular a lateral movement or lateral guidance, of the vehicle by the user, which is capable of being executed almost simultaneously with a presetting of the movement by a control unit for at least partially automated driving. The device and the operating method have been configured, in particular, to make such an interaction feasible.

By virtue of a device according to the invention and by virtue of a driving experience resulting therefrom, a so-called flow state, for example known from the so-called flow theory (or even in a widened sense) can be fostered. The interaction according to the invention with the vehicle could generate a mental state of engrossment and absorption in an activity, for instance such as a euphoria of creativity or frenzy of activity or even operational pleasure. Several features of the present invention influence, in particular, definite perceptual mechanisms of a human being. This, in turn, may lead to a significant heightening of the joy of driving and, here, the joy of interaction.

Preferentially, for the degree of the haptic contact several and, of overriding importance in principle, different degrees of the haptic contact are ascertained and taken into account—for instance, whether the operating element is being held and/or encompassed with only one hand or with both hands. But the respective manifestation of the haptic contact may also consist in the points of the operating element at which the haptic contact exists, and may, in particular, also be dependent on the force or strength with which the haptic contact obtains.

For instance, the degree of the haptic contact may be characterized by
- a measure of the contact area, in particular between the hand (palm) of the user and the operating element of the vehicle; and/or
- a pressure, in particular in the form of the total pressure force and/or pressure distribution and/or as the pressure per contact area and/or as pressure per regions of the palm, which (in a relevant time-interval) have, or foreseeably will have, a haptic contact with the operating element; and or
- the tension and/or position of one or more fingers of the user.

In this case, definite predefined regions of the operating element can preferentially be taken into account which (in the course of the steering of a vehicle in one or more different operating modes) should have, or are supposed to have to a predefined degree, a haptic contact with the hand of the user.

For instance, the pressure distribution or a pressure-distribution pattern on the operating element may be a preferred measure of the manifestation of the haptic contact. In the case of a steering handle—for example, a steering wheel—this is, for example, the rim of the steering wheel. Furthermore, within the scope of this document the term "operating element" may also be understood as a further, not necessarily round, operating element which serves for influencing, presetting or controlling at least the lateral guidance of the vehicle. The vehicle may also (depending on pre-defined conditions) be a vehicle that is capable of being driven in almost completely automated manner, in which case the steering handle may then, where appropriate, be configured to be extensible, foldable and/or fixable.

On a device according to the invention, the manifestation of the haptic contact may be an extent and/or a pattern of the haptic contact, for example with regard to the pressure or capacitive or inductive action between at least one or more fingers or hands of the user and the operating element (or the at least one part of the rim of the steering wheel). The extent may be locally limited, for instance only of significance over certain partial areas of the operating element, and accordingly may only be ascertained there, and/or the stated pattern may be an area pattern. The patterns named last by way of examples may be, for instance, an area pattern and/or a temporal pattern. The haptic contact may be characterized by a temporal criterion and/or by a parameter of its change. For instance, the degree of the haptic contact may correspond to a definite temporal change in the haptic contact. To be understood as a temporal pattern in this case is a definite temporal progression, just a pattern of a temporal dependency.

A pattern of the haptic contact may therefore, for example, be characterized in relation to a temporal progression and/or in relation to the applied physical action—for example, pressure, capacitive or inductive action—which is present from one or more fingers, a hand, two hands, a definite grip or grip pattern with one or two hands of the user on the operating element.

Such patterns or pressure patterns may, for instance, be capable of being ascertained with a capacitive or piezoelectric sensor in the operating element, for example in the steering handle, for instance with the aid of an expedient further development of a sensor mat, known as such, or a hands-on sensor. This hands-on sensor may be capable in the device also of capturing at least two-dimensional patterns and, in particular, recognizing or classifying them. In particular, an appropriately configured operating element may also be a component of the device according to the invention.

A detection may also take place of individual, definite fingers, finger combinations or finger positions relative to one another. The position or placement of the fingers relative to the parts of the operating element, for example the steering handle, can preferably also be ascertained and taken into account. The change (for example, a change in the degree of the haptic contact, of the corresponding pattern, or of a movement, corresponding to the pattern, of the one or more fingers, hand of the user) can particularly preferably also be captured and taken into account.

The capturing of the two-dimensional pattern may be effected by means of a sensor mat built into the operating element, for example into the steering handle, for example into the rim of the steering wheel. In this case, the device for capturing or ascertaining the degree of the haptic contact may also have been configured for implementing a two-dimensional pattern-recognition process. Such a pattern-recognition process may, for instance, utilize diverse methods that are derived from the specialized field of image-processing and are expediently applied in the device or operating method. In this case, the at least two-dimensional pattern-recognition process can be applied to a part of the surface of the rim of the steering handle in such a manner that the surface is mapped onto a two-dimensional area. The degree of the haptic contact is preferably configured by means of a three-dimensional pattern-recognition process, in which case at least one dimension represents a temporal progression. As a result, 4 to 16 different degrees of the haptic contact, for example, can be distinguished, for example corresponding to the patterns recognized in the process.

A degree of the haptic contact between the user of the vehicle and the operating element—for example, the steering wheel—may consequently encompass a temporal pattern and/or area pattern consisting of capacitively captured measured values which are generated by a hand or two hands of the user on the operating element (for example, on the steering handle) of the vehicle. Of course, as an alternative or in addition an application of an inductive sensing principle is also possible. Alternatively or additionally, a sensor system provided in the passenger compartment of the vehicle—for example, a camera system or image-acquisition system—may have been set up to capture the haptic contact between the hands of the user and the operating element (or at least a part of the operating element for lateral guidance of the vehicle), for instance by means of an optical object recognition for ascertaining the degree of the haptic contact or to ascertain the degree of this haptic contact. One such feature is the detection of the manifestation, or of the degree, of a haptic contact between the user and the steering wheel (or such like) and also, where appropriate, of a suitable reaction thereto.

The degree of the haptic contact can consequently be described or represented by a measure of a capacitive and/or inductive value between the operating element, in particular the steering handle, and the user (one or two palms of the user). In this way, the degree of the capacitive contact and/or inductive contact can be captured, for instance by means of a capacitive sensor integrated within the steering handle and/or by means of a steering-wheel heating wire. Alternatively or additionally, the (physical) pressure or the pressure distribution of the hand (or palms) of the user on the (manual) operating element for lateral guidance of the vehicle can be captured. In fact, the detection of the haptic contact may then be dependent on one or more pressure values and/or capacitance values or on an alteration of the pressure values and/or capacitance values that are brought about on the operating element, for instance on the steering handle of the vehicle, by one or two hands of the user. The haptic contact is preferably represented by one or more definite measures. A distinction may be made between a light (almost feeble) touching of the operating element or of a part of the operating element (for example, the rim of the steering handle) with one hand or with two hands and an encompassing of the operating element with one or with two hands of the user and also a pronounced coupling of force between the one or two hands of the user and the operating element. The coupling of force may be characterized by a tight abutment, a planar abutment and/or by a corresponding degree of frictional force.

According to a further aspect, the invention is distinguished by a computer program, the computer program having been designed to operate the device in accordance with one or more of the features described in this document and/or to implement the operating method in accordance with one or more of the features described in this document. In particular, the computer program is a software program that, for example as an app (=application) for one or more types of electronic computational units, is preferably capable of running on the electronic control unit. The computer program has preferably also been configured for taking into account, aggregating a large number of further items of information for operating the device or for implementing the operating method.

According to a further aspect, the invention is distinguished by a computer-program product that includes executable program code and/or data sections, the program code and/or data sections having been configured to enable the electronic unit to implement the operating method in accordance with one or more features of the device or of the method. The computer-program product includes, in particular, a medium, capable of being read by the computational device, or storage areas on a medium or in a back end or cloud on which the program code and/or data sections have been stored. According to a further aspect, the invention is distinguished by a product that includes a permanent right of access, or a right of access with restricted authorization, to saved data pertaining to the computer-program product. The computer-program product may take the form of an update of a previous computer program which, for instance within the scope of a functional expansion, for instance within the scope of a so-called remote software update, includes the parts of the computer program or of the corresponding program code.

The vehicle within the scope of this document is preferably a motor vehicle. This results in several advantages described explicitly within the scope of this document and further advantages comprehensible to a person skilled in the art. Nevertheless, the vehicle may also be an amphibious vehicle, a flying vehicle, a watercraft or an agricultural machine.

A particularly big advantage of the invention arises in the case of an application to a number of vehicles selected in accordance with predetermined criteria, for example belonging to one or more, for example cooperating, makes or members of an organization, to a group of users, to a group of a social network and so on. The device may also have been configured for an expedient exchange of information on the basis of the data of other vehicles from the number of vehicles. The operating method may therefore also encompass an unrestricted, restricted—for example, restricted to definite applications or conditions—access to the program code and/or data sections, for instance for a group of the vehicles and/or of the users. Furthermore, the invention also encompasses a system comprising a number of first vehicles and a number of second vehicles and/or a computational unit arranged at a distance, for example a back end for operating the vehicles.

Furthermore, the invention also encompasses all other functionalities capable of being used in the vehicle or functionalities of the vehicle that, in turn, are capable of being operated expediently on the basis of the features of the device or depending on the information ascertained in the operating method.

With the present invention it is possible to avoid an inappropriate coinciding of activities and also virtual misunderstandings between the at least one person (=driver or user, of which there may also be several in the vehicle) and the vehicle, in particular the control unit or a vehicle functionality for at least partially automated driving. Rather, a better, more effective, collaboration in the form of an interaction between user and vehicle is made possible. A particular advantage arises by virtue of an improved performance or driving performance resulting from the invention. A performance arises that has been combined from the skills of the user and the functionality of the control unit, for example the corresponding artificial intelligence.

Furthermore, with the invention a corresponding new driving experience for driving with a vehicle can also be realized. Furthermore, on the basis of the features described in this document several modes of operation or driving experiences (user experiences), for instance capable of being combined from different features of the invention and provided, for example, for various makes of vehicle, can also be realized. As one of the outcomes, a better utilisation of the resources of the vehicle and of the "resources" (in the sense of the attentiveness, efficiency, etc.) of the user may also take place, and a better driving quality may result, at least in the overall outcome.

The present invention is also suitable for many current and possibly future variants for influencing the guidance of a vehicle, for instance by means of steering wheels, pedals, joysticks, etc. The activity of the driver is no longer limited to intervening only when the automated guiding of the vehicle is not possible or does not provide sufficiently good results; rather, the driver can consciously delegate at least some of his/her driving tasks to the vehicle or, to be more exact, to the control unit thereof, just as he/she would like. An initiative of the vehicle can be set in a manner depending on the situation. In other words, a so-called rapport (compare, for example, neurolinguistic programming) between the user and the vehicle may be capable of being set or achieved.

DETAILED DESCRIPTION OF THE DRAWINGS

Figure 1:
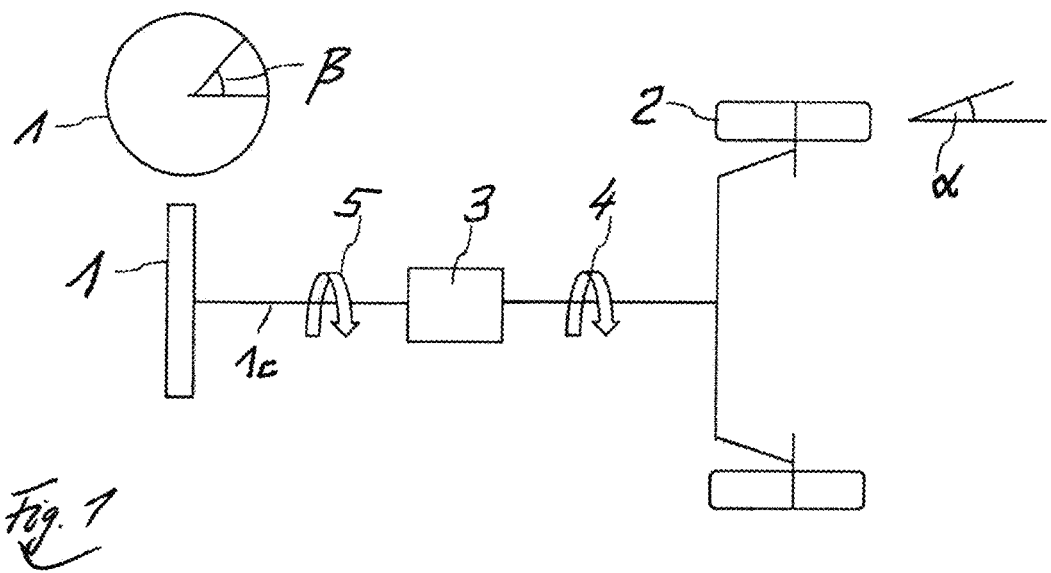
FIG. 1 shows exemplary components of a device according to an embodiment of the invention.
Figure 2:
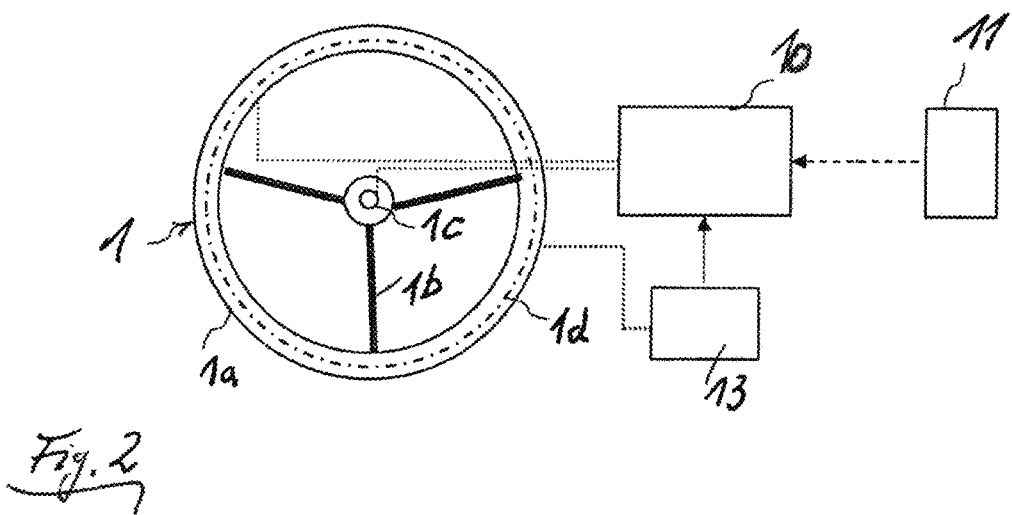
FIG. 2 shows exemplary components of a device according to an embodiment of the invention.

The appended FIGS. 1, 2 show, merely for the sake of completeness, exemplary components of a device according to an embodiment of the invention. According to FIG. 1, a steering wheel 1 of a vehicle, for instance a passenger car, is functionally connected to the steerable front wheels 2 of the vehicle. As is shown at one of the two vehicle wheels 2, these are steerable, for instance, by an angle α—that is to say, the toe angle of the wheel 2 is capable of being changed, for instance by the angle α. This is initiated by an electromotive wheel-angle regulator 3, for instance, which in accordance with rotary arrow 4 can twist a steering spindle which acts in conventional manner on a steering trapeze assigned to the steerable vehicle wheels 2. A twisting movement initiated by the driver (or user) of the vehicle with his/her steering wheel 1 can also act on the wheel-angle regulator 3 via a steering-wheel rotary shaft 1c, this being represented by rotary arrow 5. Above the steering wheel 1 a twist angle β (or driver steering angle β) showing the steering wheel clearly is represented figuratively in FIG. 1.

In FIG. 2, the steering wheel 1 of the vehicle is shown once again, and furthermore an electronic control unit 10. The latter receives, on the one hand, signals from another control unit 11 which controls an at least partially automated driving of the vehicle. Furthermore, control unit 10 (according to the invention) receives signals from an ascertainment unit 13 which ascertains a degree of the haptic contact of a driver or user with a part of the steering wheel 1, here the steering-wheel rim 1a (and generally an operating element for the lateral guidance of the vehicle). Control unit 10, in turn, not only drives the wheel-angle regulator 3 suitably, this being represented by a control line leading into the center of the steering wheel 1 or, to be more exact, to a rotary shaft 1c emanating centrally from the steering wheel, but the control unit 10 can also drive an element 1d, not represented in any detail, in the steering-wheel rim 1a of the steering wheel 1 in such a way that the degree of the coupling between the operating element or steering wheel 1 (represented by the steering-wheel rim 1a) and the wheel-angle regulator 3 is changed. (In the case of a complete coupling, a twisting movement which has been preset on the steering-wheel rim 1a by the user/driver would be transmitted completely via the spokes 1b of the steering wheel 1 to the rotary shaft 1c of the steering wheel 1 and hence to the wheel-angle regulator 3.)

What is claimed is:

1. A device for an interaction between a vehicle and a user of the vehicle, wherein the vehicle is capable of being driven in an at least partially automated manner with an operating element that is capable of being operated by the user of the vehicle for influencing at least lateral guidance of the vehicle, the device comprising a processor, wherein the device is configured to:

control a wheel-setting angle and/or a driving torque or braking torque on at least one wheel of the vehicle in response to one or more operating actions on the operating element or in a manner depending on a control unit for controlling at least partially automated driving, execute at least one movement of the vehicle depending on a change in a degree of haptic contact between the user of the vehicle and the operating element, on the basis of data from the one or more operating actions of the user and/or on the basis of data from the control unit for controlling the at least partially automated driving, evaluate one or more first operating actions of the user in a first time-interval, perform a comparison of a first movement of the vehicle that would result on the basis of the one or more first operating actions of the user with a second movement of the vehicle that would result on the basis of a movement preset from the control unit for controlling at least partially automated driving, and bring about at least one of the first movement of the vehicle or the second movement of the vehicle in a second time-interval which differs from the first time-interval based on a result of the comparison.

2. The device according to claim 1, wherein the device is further configured to:

decide, depending on the degree of the haptic contact, whether a movement of the vehicle of the at least one movement of the vehicle is to be executed on the basis of the data from the one or more operating actions of the user and/or whether the movement of the vehicle of the at least one movement of the vehicle is to be executed on the basis of the data from the control unit for controlling at least partially automated driving.

3. The device according to claim 1, wherein
one or more movement parameters of the at least one movement of the vehicle is/are capable of being ascertained by a predetermined first mathematical function on the basis of the data from the one or more operating actions of the user and/or on the basis of the data from the control unit for controlling at least partially automated driving.

4. The device according to claim 1, wherein the device is further configured to:
determine or change one or more decision criteria for a decision between a first movement of the vehicle that is based at least predominantly on the data from the one or more operating actions of the user or a second movement of the vehicle that is based at least predominantly on the movement preset from the control unit for controlling at least partially automated driving, depending on the degree of the haptic contact.

5. The device according to claim 1, wherein
a decision is made about a movement of the vehicle of the at least one movement of the vehicle on the basis of the one or more operating actions and/or depending on the movement preset from the control unit for controlling at least partially automated driving, depending on a global or local minimum of a function that represents a measurement of a disadvantage depending on the movement of the vehicle of the at least one movement of the vehicle and/or on a global or local maximum of a function that represents a measurement of an advantage depending on the movement of the vehicle.

6. The device according to claim 1, wherein
a decision is made about a movement of the vehicle of the at least one movement of the vehicle on the basis of the one or more operating actions and/or depending on the movement preset from the control unit for controlling at least partially automated driving, depending on a variable representing an available degree of automation.

7. The device according to claim 1, wherein
the data relating to the movement preset from the control unit for controlling at least partially automated driving are ascertained on the basis of environment data from one or more time-intervals that have been ascertained prior to the second time-interval and/or prior to the first time-interval.

8. The device according to claim 1, wherein the device is further configured to:
decide, depending on a currently relevant driving situation or on a roadway section currently to be driven along and/or on traffic rules applying currently or locally, to execute a movement of the vehicle of the at least one movement of the vehicle on the basis of the one or more operating actions and/or depending on the movement preset from the control unit for controlling at least partially automated driving.

9. The device according to claim 4, wherein
a degree of coupling between at least a first part of the operating element and at least one wheel-angle regulator of the vehicle is capable of being set or changed, depending on the decision as to whether a movement of the vehicle of the at least one movement of the vehicle is to be executed on the basis of the data from the one or more operating actions of the user and/or whether the movement of the vehicle of the at least one movement of the vehicle is to be executed on the basis of the movement preset from a control unit for controlling at least partially automated driving.

10. The device according to claim 9, wherein
one or more operating actions of the user representing a desired movement of the vehicle are capable of being captured with the at least partially decoupled operating element.

11. The device according to claim 1, wherein
the operating element is a steering handle that is capable of being operated with one or two hands of one or more users and has been configured for controlling at least the lateral guidance of the vehicle in an at least partially manual driving mode and has also been configured for influencing longitudinal guidance of the vehicle in an at least partially automated driving mode.

12. The device according to claim 1, wherein
a movement of the vehicle of the at least one movement of the vehicle is capable of being executed on the basis of the one or more operating actions and/or depending on the movement preset from the control unit for controlling at least partially automated driving, depending on one or more of the following parameters, the parameters being characteristic of:
a state of attentiveness of the user,
a direction of vision or accommodation of vision, and
a state of the user.

13. The device according to claim 1, wherein the device is further configured to:
output driver information that characterizes at least one decision reason for the at least one movement of the vehicle on the basis of the data from the one or more operating actions of the user and/or on the basis of the data from the control unit for at least partially automated driving.

14. An operating method for an interaction between a vehicle and a user of the vehicle, wherein the vehicle is capable of being driven in an at least partially automated manner with an operating element that is capable of being operated by the user of the vehicle for influencing at least lateral guidance of the vehicle, the method comprising:
controlling a wheel-setting angle and/or a driving torque or braking torque on at least one wheel of the vehicle in response to one or more operating actions of the user on the operating element or in a manner depending on a control unit for controlling at least partially automated driving,
executing at least one movement of the vehicle, depending on a change in a degree of haptic contact between the user of the vehicle and the operating element, on the basis of the one or more operating actions of the user and/or on the basis of the data from the control unit for controlling the at least partially automated driving,
evaluating one or more first operating actions of the user in a first time-interval,
performing a comparison of a first movement of the vehicle that would result on the basis of the one or more first operating actions of the user with a second movement of the vehicle that would result on the basis of a movement preset from the control unit for controlling at least partially automated driving, and
bringing about at least one of the first movement of the vehicle or the second movement of the vehicle in a second time-interval which differs from the first time-interval based on a result of the comparison.

15. A computer product comprising a non-transitory computer readable medium having stored thereon program code which, when executed in a computational unit, controls a wheel-setting angle and/or a driving torque or braking torque on at least one wheel of the vehicle in response to one or more operating actions of the user on the operating element or in a manner depending on a control unit for controlling at least partially automated driving, executes at least one movement of the vehicle, depending on a change in a degree of haptic contact between the user of the vehicle and the operating element, on the basis of the one or more operating actions of the user and/or on the basis of the data from the control unit for controlling the at least partially automated driving, evaluates one or more first operating actions of the user in a first time-interval, performs a comparison of a first movement of the vehicle that would result on the basis of the one or more first operating actions of the user with a second movement of the vehicle that would result on the basis of a movement preset from the control unit for controlling at least partially automated driving, and brings about at least one of the first movement of the vehicle or the second movement of the vehicle in a second time-interval which differs from the first time-interval based on a result of the comparison.

16. The device according to claim 1, wherein the device is further configured to:

decide, depending on the degree of the haptic contact, whether and to what extent a movement of the vehicle of the at least one movement of the vehicle is to be executed on the basis of the data from the one or more operating actions of the user and/or whether and to what extent the movement of the vehicle of the at least one movement of the vehicle is to be executed on the basis of the data from the control unit for controlling at least partially automated driving.

17. The device according to claim 4, wherein a degree of coupling between at least a first part of the operating element and at least one wheel-angle regulator of the vehicle is capable of being set or changed, depending on the decision as to whether and to what extent a movement of the vehicle of the at least one movement of the vehicle is to be executed on the basis of the data from the one or more operating actions of the user and/or whether and to what extent the movement of the vehicle of the at least one movement of the vehicle is to be executed on the basis of the movement preset from the control unit for controlling at least partially automated driving.

18. The device according to claim 1, wherein the device is further configured to determine in steps, or to change substantially in stepless manner, a relationship between the data from the one or more operating actions of the user and the data from the control unit for controlling at least partially automated driving in a course of determining the at least one movement of the vehicle, or a respective number of features for presetting the at least one movement of the vehicle, depending on the degree of the haptic contact.

* * * * *